United States Patent [19]

Rains et al.

[11] 3,762,877
[45] Oct. 2, 1973

[54] METHOD OF AND APPARATUS FOR DEPOSITING A FLUID IN A GEL

[75] Inventors: Stephen D. Rains, Henrietta; Leon L. Wheeless, Jr., Webster, both of N.Y.

[73] Assignee: Bausch & Lomb Incorporated, Rochester, N.Y.

[22] Filed: May 24, 1971

[21] Appl. No.: 146,262

[52] U.S. Cl. ............... 23/230 B, 23/253, 195/139, 204/180 G, 204/299 R
[51] Int. Cl. ...... C12b 1/00, C12k 1/10, G01n 33/16
[58] Field of Search .............................. 350/92–95; 356/105, 244–246; 117/95; 195/127, 139 LE; 23/230 B, 253; 204/180 G, 299 R

[56] References Cited
UNITED STATES PATENTS

| | | | |
|---|---|---|---|
| 3,205,151 | 9/1965 | Landau et al. | 195/139 LE |
| 3,556,633 | 1/1971 | Mutschmann et al. | 350/95 |
| 2,761,558 | 9/1956 | McLean | 350/92 X |
| 3,308,039 | 3/1967 | Nelson | 195/103.5 R |
| 3,616,265 | 10/1971 | Calabrese et al. | 195/139 |

*Primary Examiner*—Morris O. Wolk
*Assistant Examiner*—R. M. Reese
*Attorney*—Frank C. Parker and Bernard D. Bogdon

[57] ABSTRACT

Apparatus suitable for application in chemical analysis and particularly electrophoresis and utilizing a gel cast into a frame through which a wire-like element, having a fluid sample deposited proximate one of its ends, is drawn. Upon withdrawal of the wire-like element the fluid sample fills the space previously occupied by the wire-like element. The line of fluid sample through the gel is thereby placed exactly in the previous location of the probe and occupies the same volume and shape as the probe. After the line of fluid sample has been deposited through the gel it may be analyzed quickly and accurately by, for example, the process of electrophoresis, immunoelectrophoresis or immunodiffusion.

25 Claims, 11 Drawing Figures

PATENTED OCT 2 1973 3,762,877

STEPHEN D. RAINS
LEON L. WHEELESS JR.
*INVENTORS*

BY
BERNARD D. BOGDON
*ATTORNEY*

PATENTED OCT 2 1973 3,762,877

STEPHEN D. RAINS
LEON L. WHEELESS JR.
INVENTORS

BY
BERNARD D. BOGDON
ATTORNEY

STEPHEN D. RAINS
LEON L. WHEELESS JR.
INVENTORS

BY
BERNARD D. BOGDON
ATTORNEY

METHOD OF AND APPARATUS FOR DEPOSITING A FLUID IN A GEL

BACKGROUND OF THE INVENTION

1. Cross-Reference to Related Applications

This invention is related to the invention described in the concurrently filed and copending applications entitled, "Electrophoresis System And Gel Frame," Ser. No. 146,387, Filed May 24, 1971, for inventor Stephen D. Rains, and "Immunoelectrophoresis Gel Tray," Ser. No. 146,388, Filed May 24, 1971, for inventor Stephen D. Rains.

2. Field of the Invention

This invention relates to the deposition of a fluid sample into a gel by depositing the fluid sample at the end of a wire-like element located within the gel and then extracting or withdrawing the wire-like element from the gel. More particularly, this application is directed toward an electrophoresis test unit wherein an analysis of the sample positioned within the gel may be easily and accurately made.

3. Description of the Prior Art

The process of chemical analysis, and particularly electrophoresis is generally old and well known and consequently will not be discussed to any great length. Generally, however, the particular process of electrophoresis requires (1) a support medium such as a gel, formed within a convenient apparatus; (2) the application of a specimen mixture to the support medium; (3) maintaining an electric potential through the medium until such time that the specimen mixture separates into individual components; and (4) distinguishing and analyzing the individual components of the specimen mixture. Various methods have been used in the past for electrophoresis testing and usually these procedures have required very expensive and complicated equipment which, by necessity, required the presence of highly skilled technicians who would be able to spend the required amount of time to prepare the apparatus, perform the required operations and then, subsequently, clean the equipment in preparation for the next analysis. Such a device is disclosed in U.S. Pat. No. 3,371,027, issued Feb. 27, 1968 to A.J. LaPaglia et al. Basically, the apparatus disclosed in the LaPaglia et al patent includes a migration tank having two buffer chambers joined by a table. Connected to the table are conduits through which a temperature controlled fluid flows for regulating the temperature of a migration medium. An applicator has a string thereon upon which the sample to be analyzed is disposed. The applicator is then placed in its selected position over th migration table thereby placing the string containing the sample into contact with the migration medium which has overflowed the buffer chambers onto the table to a level of approximately 1.7 mm. An electric voltage is then applied to the migration table to cause the various constituents of the sample to migrate in accordance with their specific abilities. The foregoing apparatus is complicated and the operator skill required to operate the same is such that the tests so conducted are costly and time consuming. Such factors are overcome by the present device.

There are other products on the market which allow analysis of samples, one such being the "Enterotube" a produced of Roche Diagnostics, Nutley, N.J. This device discloses an inoculating needle which has a deposit from an isolated colony, in solid form, placed thereon. The needle is drawn through a multi-chambered device which contains a number of different cultures. The first and last chambers are filled with the same substance so that when the results are interpreted it can be determined whether or not a successful test has been completed by comparing the results in the first chamber with the results in the last chamber. Each "Enterotube" must be packaged with the exact culture media pertinent to the inoculation sample and, therefore, versatility is limited. The "Enterotube" uses colonies in solid form through which the culture containing an inoculating needle is pulled. The "Enterotube," therefore, is primarily for determining what kind of bacteria is present in lab cultered specimens grown from human serum.

There are, of course, a number of other prior art references dealing with chemical anslysis and particularly electrophoresis. The examples given above only indicate a small sample of them.

SUMMARY OF THE INVENTION

The invention presented herein is applicable to a wide variety of tests and is particularly applicable for use in electrophoresis. Toward this end, the apparatus used is one of simple and relatively inexpensive manufacture. The person carrying out the electrophoresis procedure need not be one skilled in the highly technical fields pertaining to chemical analysis. Correct sample application can be performed by a novice operator, because no special rapid or deft motions are required. Therefore, the invention eliminates the training and practice usually needed to acquire and maintain proficiency in sample application skills. It is merely necessary for the operator to deposit a certain amount of sample fluid upon one of the proximate ends of a wire-like element or similar article which is located within a gel being confined within a frame.

There has been a great need in the analytical medical field for a device for use in electrophoresis which is accurate, inexpensive to make and easily operated by nearly anyone of ordinary skills.

Thus, to this end, the invention disclosed herein has been directed. There are, of course, other features of the present invention which will become apparent from the following description and accompanying drawings which form a part of this application.

DETAILED DESCRIPTION OF THE PREFERRED EMBODIMENT

Figure 1:
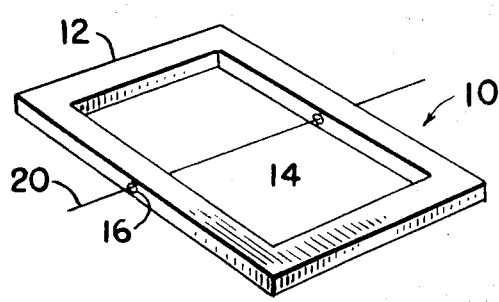
FIG. 1 is a perspective view of an apparatus, according to the principles of the present invention.

Referring now particularly to the drawings wherein like reference characters indicate like parts, the apparatus for use in electrophoresis shown in FIG. 1 is indicated by reference numeral 10 which includes a relatively thin frame 12 of about 1/16th of an inch in thickness; and having an open center or aperture 14 therein and a passageway or hole 16 extending laterally through the side portion of the frame. A wire-like element 20, such as a stiff thread, is placed through the passageway 16 and extends through the aperture 14 in the frame 12.

Figure 2:
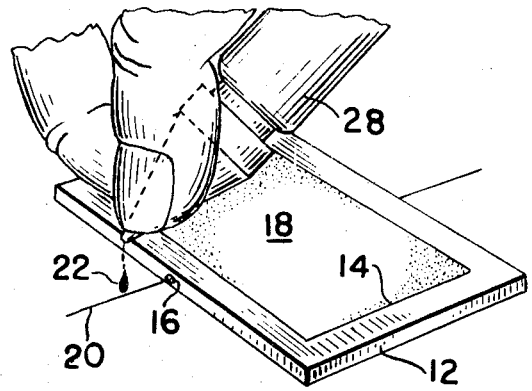
FIG. 2 is a perspective view of the apparatus of FIG. 1 showing a gel disposed within the aperture and having a drop of sample fluid being deposited upon a wire-like element disposed through the frame of FIG. 1.
Figure 3:
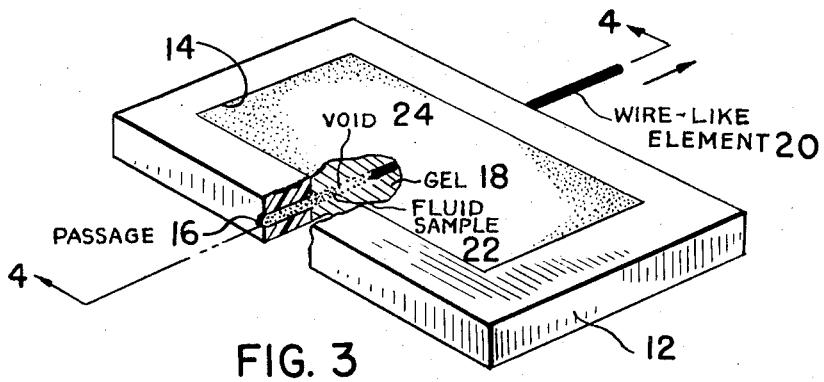
FIG. 3 is a perspective view of the apparatus of FIG. 2, partially broken away, showing the wire-like element being withdrawn from the gel and depositing the fluid therein.
Figure 4:
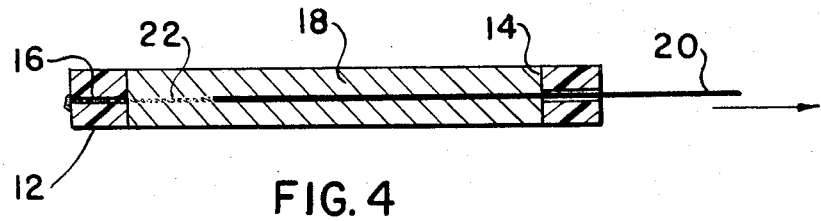
FIG. 4 is a sectional view taken along line 4—4 of FIG. 3.

Referring now to FIG. 2, the aperture 14 in frame 12 has a gel cast therein and the wire-like element 20 is encompassed by the gel 18. When the wire-like element 20 is withdrawn from the gel 18 a void is left in the gel. The sample fluid 22, is deposited on the wire-like element 20, before withdrawal of same, by an eye-dropper 28 or similar article, such as is disclosed in U.S. Pat. No. 3,552,605 issued to Gary Hein on Jan. 5, 1971. The sample fluid 22 then fills the void 24 left in the gel 18 as the wire-like element 20 is withdrawn from the gel 18, as best seen in FIG. 3. As the wire-like element 20 is withdrawn from the gel 18 the void 24 left within the gel 18 is of exactly the same size and shape as that of the now withdrawn wire-like element 20. Consequently, when the fluid 22 fills the void 24, as best seen in FIGS. 3 and 4, the fluid 22 has an exactly defined size and shape. Because the fluid 22 is uniquely defined within the former void 24 in the gel 18 there is no tendency for the sample fluid 22 to take an irregular shape. Further, the amount of fluid 22 that will be deposited into the gel 18 is an exact quantity known to the operator of the equipment.

During the course of developments concerning the present invention it has been found that the gel takes a set which perfectly matches the size and shape of the wire-like element which is confined within the gel. The gel is of a consistency such that the passageway in it, caused by the wire-like element, will not collapse, or in special instances, explained further on, stay collapsed, after removal of the wire-like element. As the wire-like element is withdrawn, the sample fluid is caused, by vacuum, gravity or capillary action to fill the void left in the gel. Accordingly, the exact amount of sample fluid is always deposited in the gel. The device avoids the traditional sample application problems of spattering and smearing, so there is no residue which has to be cleaned up before the test can begin.

Figure 5:
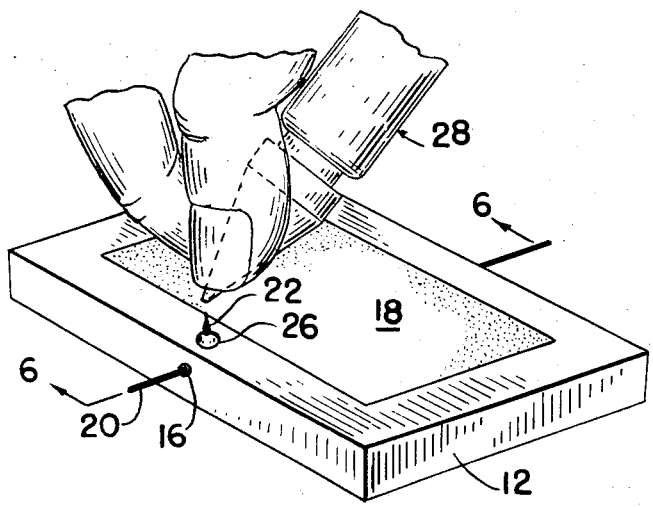
FIG. 5 is a perspective view of a further embodiment, according to the principles of the present invention, showing a reservoir formed at the upper surface of the frame communicating with the wire-like element and also showing means of introducing the fluid to the wire-like element.
Figure 6:
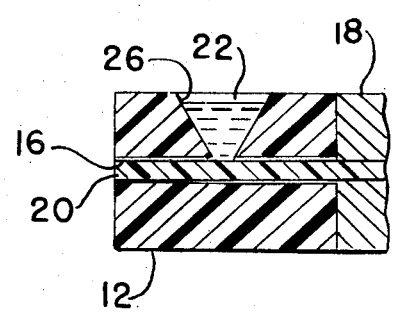
FIG. 6 is an enlarged, fragmentary sectional view taken along lines 6—6 of FIG. 5.

The sample fluid 22 has been shown as being deposited on a portion of the wire-like element which extends outwardly from the frame 12 in FIG. 2, although, as will be seen in FIG. 5, the sample fluid 22 may be deposited onto the wire-like element 20 through a reservoir or opening 26 formed in the frame 12. After the sample fluid 22 reaches a desired level in the reservoir 26 the wire-like element 20 is withdrawn from the gel 18 and the sample fluid 22 is caused to fill the void 24 left by the wire-like element 20. The fluid 22 is shown being introduced to the wire-like element 20 by a simple eye-dropper 28, although any suitable means could be used.

It will readily be appreciated that the wire-like element 20 may be drawn in either direction irrespective of the disposition of a reservoir, if used. However, it is preferred that the wire-like element 20 be drawn outwardly from the frame 12 toward the side opposite a reservoir or side to which the fluid is disposed for filling the void. In addition, an alternate embodiment would comprise a gel frame carrying a generally centrally located gel having a wire disposed through one side of the gel frame in communication with a reservoir at that same side to extend partially into the gel, but short of the opposite side of the gel frame. In operation, as the wire-like element is pulled out, the gel collapses into the void until the end of the wire reaches the sample filled reservoir at which time the pressure within the void and the ambient atmosphere are equalized and the "memory" of the elastic gel causes the gel to rebound to the configuration that it originally maintained about the wire-like element. At that time the created condition causes the fluid sample from the reservoir to flow into the void and thereby consequently introduces the fluid into the gel in the path originally defined by the wire-like element. This alternate embodiment is particularly useful in immunoelectrophoresis.

Figure 8:
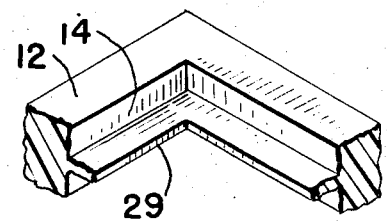
FIG. 8 is a partial perspective view of a further embodiment of the apparatus, according to the principles of the present invention, showing a gel support ledge formed in the aperture.
Figure 7:
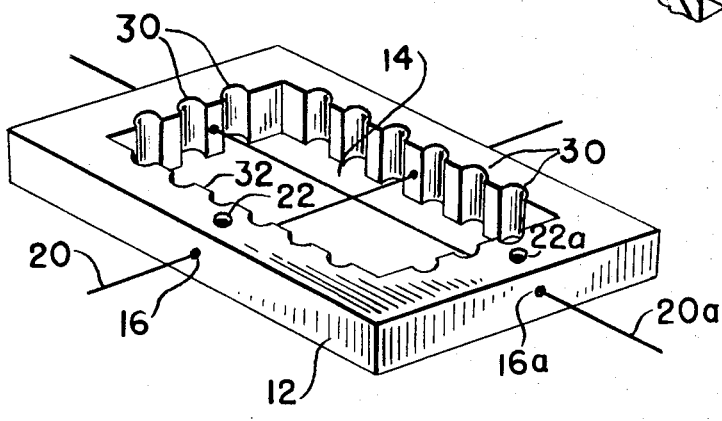
FIG. 7 is a perspective view of a further embodiment of the apparatus, according to the principles of the present invention, showing the gel supporting aperture having an irregular shape and a plurality of wire-like elements disposed therethrough.
Figure 9:
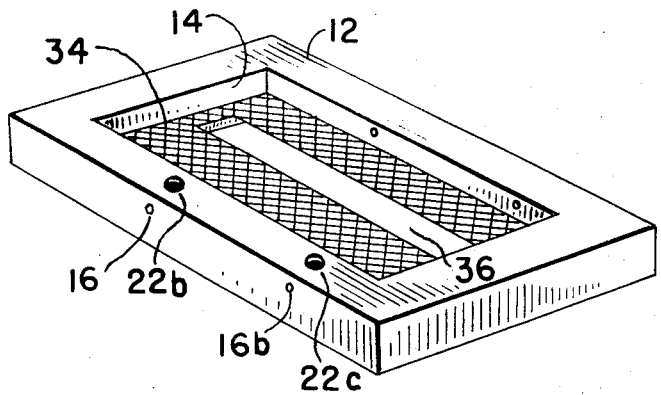
FIG. 9 is a perspective view of a still further embodiment of an apparatus according to the principles of the present invention, showing a grid-like element disposed within the aperture and having a plurality of passageways communicating the frame and the aperture.
Figure 10:
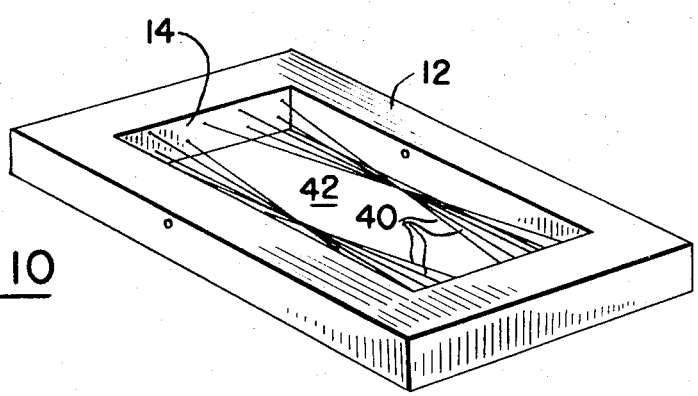
FIG. 10 shows another embodiment of an apparatus, according to the principles of the invention, showing a number of reinforcing rods disposed within the aperture.
Figure 11:
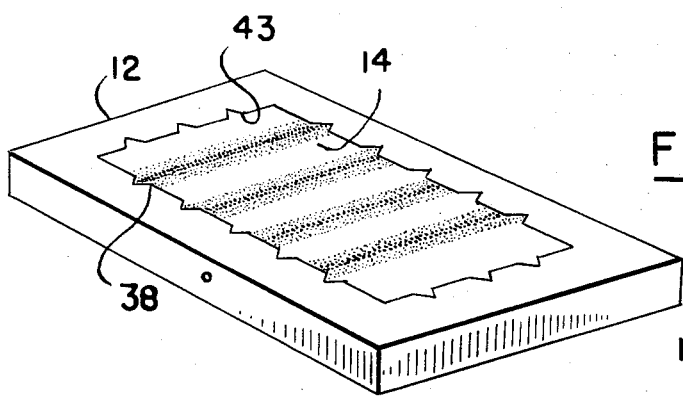
FIG. 11 shows another embodiment of an apparatus, according to the principles of the present invention, disclosing Vee-slots formed in the aperture and also showing a completed migration in the gel.

It is obvious that there are many ways in which the gel 18 may be supported within the aperture 14 and a number thereof, according to the principles of the present invention, are shown in FIGS. 7–11. Specifically, FIG. 7 shows the aperture or opening 14 having irregular shaped notches 30 located about the periphery 32 of the opening 14. FIG. 8, a further embodiment, shows the aperture 14 of frame 12 having a gel support ledge 29 formed therein. FIG. 9, another embodiment, discloses a grid-like element 34, comprised of, for example, a non-corrodible mesh, positioned in the aperture or opening 14. The grid-like element 34 has an opening 36 transverse to the passageways 16 and 16b to allow the fluid to be analyzed when the migration path 38, as disclosed in FIG. 11, and shown and disclosed in U.S. Pat. No. 3,399,127, issued to R.N. Rand et al. on Aug. 27, 1968, has been completed. The opening 36 disclosed may be necessary to allow analysis of the migration path according to well-known principles, which are particularly discussed in the patent issued to LaPaglia et al., mentioned earlier. FIG. 9 also discloses a plurality of holes, 16 and 16b, which are utilized when more than one test is to be run at the same time. It is, of course, understood that the holes do not necessarily have to be parallel to one another. They may be positioned in many ways. FIG. 10 discloses a number of rods 40, comprising for example, non-corrodible rods, traversing the aperture 14. The rods 40 are situated in the aperture or opening 14 in such a manner as to leave an opening 42, much the same as the opening 36 in FIG. 9. Again, as in FIG. 9, the opening 42 allows the sample to be analyzed once a completed migration has taken place. FIG. 11 shows Vee-shaped slots 43 located about the periphery of the opening 14 in the frame 12. In particular, in the embodiments illustrated in FIGS. 9 and 10 there are, respectively, disclosed openings 36 and 42 to allow transmission of ultraviolet radiation therethrough by any suitable analytical instrument. It will be appreciated that in immunological applications such as that disclosed in the previously mentioned Rains patent application entitled "Immunoelectrophoresis" the migration is observed visually without the aid of externally disposed analytical instruments. However, providing a slot for transmission of ultraviolet radiation is particularly useful, for example, in applications involving serum protein electrophoresis with quantification by ultraviolet absorption of peptide bonds.

It will be noted that in the figures previously described there appeared only one passageway, generally designated by numeral 16, extending through the frame 12. As shown in FIG. 7 and FIG. 9, however, there are a pair of passageways extending through the frame 12 and communicating with the aperture 14. Specifically, FIG. 7 discloses a passageway 16 positioned transversely to a second passageway 16a, both extending through the frame 12. Positioned within the passageways 16 and 16a are wire-like elements 20 and 20a. This method of positioning one wire-like element 20 transverse to the other wire-like element 20a is especially useful in immunological analysis of two different fluid samples. For instance, it may be desirable to test one fluid sample from a person who is suspected of having hepatitis. To do so the operator of the equipment deposits the fluid sample 22 from the person suspected of having hepatitis onto one of the wire-like elements 20. The oerator then deposits another fluid sample 22a, containing Australia antigen, onto the second wire-like element, 20a. Thereafter, the two wire-like elements 20 and 20a are withdrawn from the gel 18 through the passageways 16 and 16a. The fluid samples 22 and 22a are drawn into the passageways defined within the gel by the withdrawal of the wire-like elements 20 and 20a and thereafter begin to diffuse in all directions, including the direction toward each other. When the two fluid samples 22 and 22a have diffused far enough to make contact with one another they will react together to form a characteristic precipitin if the diagnosis is positive. However, the absence of a precipitin would indicate that the patient did not have hepatitis.

The two perpendicular non-intersecting passageways 16 and 16a disclosed in FIG. 7 is one method for antigenantibody testing as described immediately above, but there are others. For instance, the configuration of FIG. 9 can also be used. In this particular application the patient's serum would be applied at 22b and the previously mentioned Australia antigen at 22c. The resulting diffusion of the two fluids in the gel could be aided by the process of electrophoresis. The operator, by merely selecting the appropriate gel constituents, can make the Australia antigen flow backwards when the operator introduces an electric field to the apparatus. This is known as electroendosmosis. While this is taking place the patient's serum, particularly the protein in the serum, is moving forward in the gel. In other words, the two samples can be made to move preferentially and rapidly toward each other. This process hastens the appearance of the precipitin in positive cases.

In the methods disclosed in the prior art the process of depositing two fluid samples from two different sources onto a gel medium was conducted in a less controlled and less precise manner. For instance, the two fluid samples would be deposited onto the gel medium at a distance which was generally only approximated by the operator. If the distance between the two fluid samples on the gel medium was too far apart no analysis, or only a poor analysis, could be made. If the distance was too close the fluid samples might bleed into one another by spreading along the surface of the gel and no analysis could be made. The invention disclosed herein avoids all of these complications by arranging the apparatus so that the fluid samples may be deposited at stations remote from one another. Also, the fluid samples intercept each other in the gel at a predetermined distance and accurate analysis and results are facilitated. Better control of the locations and amounts of the two fluids facilitates the obtaining of repeatable tests, day-to-day, in each laboratory and also improves the agreement between laboratories.

In electrophoresis analysis the passageways 16 and 16b, shown in FIG. 9, are parallel to one another and are used in running a series of tests concerning fluid samples from two different donors. The migration path that the fluid samples 22b and 22c will take are fairly well known as to their total lengths. By designing the frame 12 and aperture 14 to a specific size and shape it will be known that one migration will not interfere with the other migration. It is evident that more than two tests may be run simultaneously by merely providing a frame equipped with any number of passageways desired.

It is, of course, understood that although specific elements described are given specific names there are a number of other items that would perform equally as well.

For instance, it was found during the process of experiments, that a relatively thin plastic frame, of about 1/16 inch in cross-section works very well when combined with an agarose gel, a product that may be obtained in powder form from Marine Colloids of Rockland, Maine — also available from several other suppliers all over the world. The powdered agarose need only be boiled in water and then allowed to set which results in a substance having gel-like qualities. The agarose gel is introduced into the aperture in the thin plastic frame before the gel sets.

Further, before the gel sets in the aperture it becomes necessary to provide reference surfaces on the top and bottom of the gel frame directly in contact with the yet unset gel. These reference surfaces are made of a relatively even, smooth faced material which result in the gel having even, smooth upper and lower surfaces. This is necessary to insure that there are no uneven or thick or thin spots in the gel which cause false readings when the electrophoresis process has been completed and the analysis has been made. Flat parallel faces facilitate analysis by transmission of radiant energy, such as analysis by spectrophotometry or by refractometry. Also, after the reference surfaces have been removed from the gel containing frame the gel is fully unsupported on two parallel surfaces, which is quite useful in the art of electrophoresis and never before practiced in the art. In the past it has been very necessary that the agar gel should be supported on its lower surface to prevent the gel from collapsing out of the gel frame. Applicant has found that by using the relatively thin frame defining an opening of predetermined size and by using the previously mentioned agar gel, the gel could be caused to support itself within the aperture of the frame. Further, because the frame is relatively thin, of about 1/16 inch in cross-section as hereinbefore stated, optical scanning through the correspondingly thin agar gel is quite precise, as the required amount of ultra-violet rays are transmitted through the gel in the necessary wavelength range. Previously, it was necessary to provide support to the gel on, generally, the gel's bottom surface. This support was generally made from quartz, which is a suitable material for transmitting light in the required wavelength range. The quartz plate as shown, for example, in the previously referenced patent to La Paglia et al. was quite costly to provide. Applicant's instant invention avoids this costly quartz plate and provides for a much simpler device at the same time. The wire-like element which passes through the frame and the gel performs extremely well if it is made from a stiff, synthetic, preferably non-corrodible material, such as plastic. However, it has also been found that any material which does not contain harmful contaminants will work satisfactorily and further, that it may be of varied uniform or nonuniform cross-sectional configuration. For example, a slip of paper will work, as well as a probe of cross-sectional shape such as triangular or star-shaped.

In one specific instance it was found that a length of ordinary string, or similar article worked extremely well when it was placed into the gel frame in a manner similar to that of the wire-like element explained previously. One of the ends of the string is dipped into a fluid sample and allowed to become saturated. Once the end of the string becomes saturated the unsaturated end opposite it is pulled which displaces the saturated end and, consequently introduces the saturated end to the gel confined within the gel frame. Thereafter, either the electrophoresis or diffusion process could be carried out. The sample would migrate out of the string, or similar article, and into the gel. The operator would have the option of either removing the string or leaving it in place, whichever he desires.

Although we have described some of the articles we have used to gain successful results, it is understood that changes and modifications, within the scope of the invention will be made.

We claim:

1. A device for supporting gel useable as a medium in analyzing chemical constituents by chemical separation, comprising:
   a generally flat and relatively thin frame having a perimeter defining an opening in the frame for receiving gel and supporting gel within the opening; and
   means for providing a pressure reduction between a first and a second point within gel supported about the perimeter of the frame to move chemical constituents from the first to the second point within gel.

2. The device as defined in claim 1 for use in electrophoresis, wherein the perimeter of the opening formed within the frame is of irregular shape.

3. The device as defined in claim 1 for use in electrophoresis, wherein the perimeter is defined by keystone shaped edges.

4. The device as defined in claim 1 for use in electrophoresis, wherein the perimeter is defined by Vee-shaped slots.

5. The device as defined in claim 1 wherein the means is disposed within the gel and is a wire-like element.

6. The device as defined in claim 5 wherein the wire-like element is formed of a thread-like material.

7. The device as defined in claim 6 wherein the thread-like material is a string having absorbent qualities to permit the chemical constituents to be absorbed therein when the string is at least in part immersed in the chemical constituents.

8. The device as defined in claim 1, wherein the means for providing a pressure reduction between a first point and a second point within gel supported about the perimeter of the frame is a filament to be disposed within the supported gel and movable within the gel from the first point to the second point to create a pressure reduction between the first point and the second point for moving chemical constituents under the influence of the created pressure differential from the first point to the second point within the gel.

9. The device as defined in claim 8, wherein the frame has a passageway formed therein for supporting the filament.

10. The device as defined in claim 8, wherein the frame having a perimeter defining an opening in the frame, defines a plurality of passageways each for supporting a filament, and including a plurality of filaments, respectively, one filament disposed in each of the passageways.

11. The device as defined in claim 8, further including means for communicating fluid to the filament comprising a reservoir defined by the frame in communication with the filament.

12. The device as defined in claim 1 further comprising:
   support means extending from the perimeter of the frame to means within the opening for providing support for the gel to maintain a generally fixed relationship between the gel and the frame.

13. The device for supporting a gel as defined in claim 12, wherein the support means for providing support to the gel comprises a ledge formed about the perimeter of the frame defining the opening.

14. The device for supporting a gel as defined in claim 12, wherein the support means for providing support to the gel comprises a grid-like element affixed to the frame at the perimeter.

15. The device as defined in claim 14, wherein the grid-like element fixed to the frame has an opening therein to provide for optical viewing by an externally disposed apparatus.

16. The device as defined in claim 12, wherein the support means within the opening for providing support for the gel comprises rods traversing the opening and affixed to the frame.

17. The device as defined in claim 16, wherein the rods traversing the opening define an outline therein to provide for optical viewing by an externally disposed apparatus.

18. A device for supporting gel useable as a medium in analyzing chemical constituents by chemical separation, comprising:
a generally flat and relatively thin frame having a perimeter defining an opening in the frame for receiving gel and supporting gel within the opening; and
means for flowing chemical constituents by capillary action between a first point and a second point within gel supported about the perimeter of the frame.

19. A device for supporting gel useable as a medium in analyzing chemical constituents by chemical separation, comprising:
a generally flat and relatively thin frame having a perimeter defining an opening in the frame for receiving gel and supporting gel within the opening;
a gel disposed within the opening of the frame and supported at the perimeter defining the opening in the frame; and
means for providing a pressure reduction between a first point and a second point within the gel supported about the perimeter of the frame to move chemical constituents from the first point to the second point within the supported gel.

20. The device as defined in claim 19, wherein the means for providing a pressure reduction between a first point and a second point within the gel supported about the perimeter of the frame is a filament to be disposed within the supported gel and movable within the gel frame from the first point to the second point to create a pressure differential between the first point and the second point thereby causing the movement of the chemical constituents from the first point to the second point within the gel.

21. A device for supporting a gel useable as a medium in analyzing chemical constituents by the process of chemical separation, comprising:
a generally flat and relatively thin frame having a perimeter defining an opening in the frame for receiving gel and supporting gel within the opening;
a gel disposed within the opening of the frame and supported at the perimeter defining an opening in the frame; and
means for flowing chemical constituents by capillary action between a first point and a second point within the gel supported about the perimeter of the frame.

22. The device as defined in claim 21 wherein the means for flowing chemical constituents by capillary action comprises an element formed of a thread-like material.

23. The device as defined in claim 22 wherein the element formed of a thread-like material is a string having absorbant qualities to permit the chemical constituents to be absorbed therein when the string is at least in part immersed in the chemical constituents.

24. A method of flowing a fluid into a void formed in a gel supported within an opening defined by an inner perimeter of a frame supporting a filament at least partially surrounded by the gel, comprising the steps of:
disposing the filament across at least part of the opening within the frame;
forming the gel within the opening and about at least part of the filament;
supporting the gel at the inner perimeter of the frame;
depositing the fluid onto the filament;
withdrawing the filament from the gel to create a void; and
flowing the fluid into the void left by the filament.

25. A method of introducing a fluid into a defined path within a gel, comprising the steps of:
providing a relatively thin rectangular support frame including side walls which enclose an opening and have at least one pair of through apertures which communicate with said opening;
placing an elongated element having absorbent properties and first and second ends across said opening and through said pair of apertures;
forming said gel within said opening and about said elongated element to define a path within the gel;
introducing said fluid onto said first end of said elongated element; and
allowing a sufficient period of time to elapse for the fluid to be absorbed into and along said elongated element a predetermined distance towards said second end to thereby introduce the fluid into the defined path within the gel.

* * * * *